(No Model.)
J. NAGEL.
APPARATUS FOR OBTAINING DISTILLED AND STERILIZED WATER.
No. 523,230. Patented July 17, 1894.
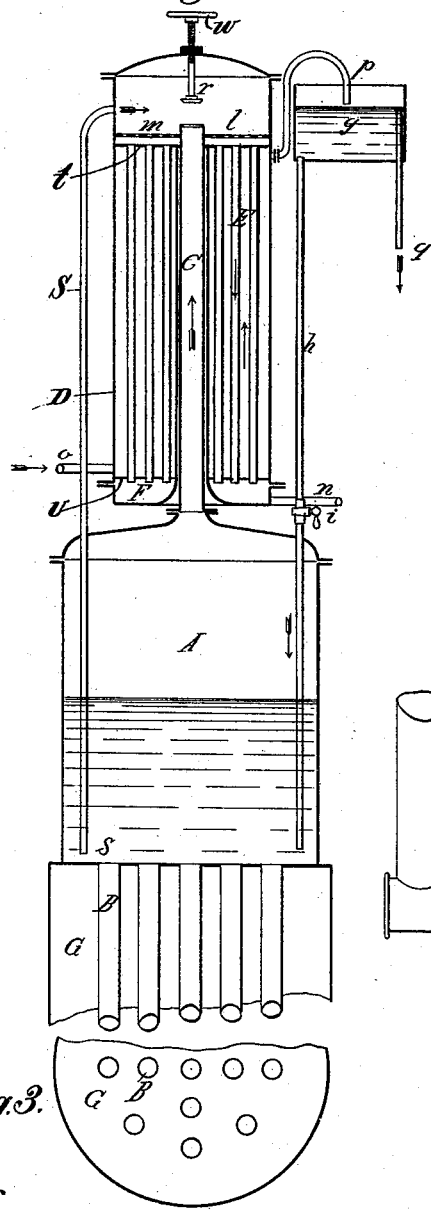
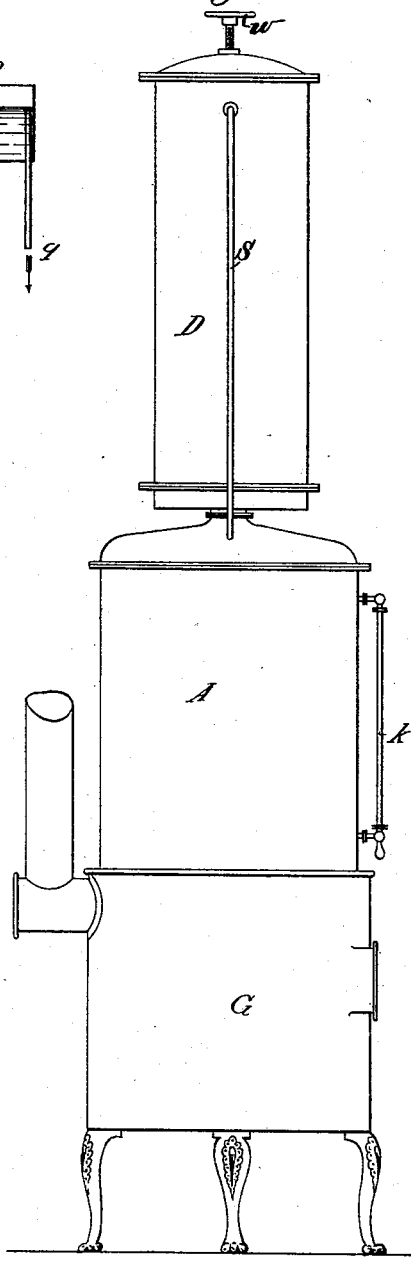
Witnesses.
Inventor.
Josef Nagel.
By James L. Norris
Atty.
THE NORRIS PETERS CO., PHOTO-LITHO., WASHINGTON, D. C.

United States Patent Office.

JOSEF NAGEL, OF CHEMNITZ, GERMANY.

APPARATUS FOR OBTAINING DISTILLED AND STERILIZED WATER.

SPECIFICATION forming part of Letters Patent No. 523,230, dated July 17, 1894.

Application filed December 26, 1893. Serial No. 494,791. (No model.) Patented in Germany March 10, 1893, No. 71,399.

*To all whom it may concern:*

Be it known that I, JOSEF NAGEL, a subject of the Emperor of Germany, residing at Chemnitz, in the Empire of Germany, have invented certain new and useful Improvements in Apparatus for Obtaining Distilled and Sterilized Water, (for which I have obtained a patent in Germany, No. 71,399, dated March 10, 1893,) of which the following is a specification.

This invention, relates to the distilling and sterilizing of water to render it fit for drinking, cooking and other purposes and has for its object to provide a simple, convenient and compact apparatus for converting impure water into good water either by evaporation and condensation or by simply boiling and cooling, as may be preferred.

The invention consists in the features of construction and novel combinations of parts in a distilling and sterilizing apparatus for improving the quality of water, as hereinafter more particularly set-forth.

In the annexed drawings—Figure 1 is an elevation of my improved distilling and sterilizing apparatus. Fig. 2, is a vertical section of the upper portions of the same, at a right angle to the preceding figure. Fig. 3, is a part sectional plan of the furnace constituting the lower portion of the apparatus.

The apparatus comprises a cylindrical boiler or still A having a series of tubes B depending from its lower surface and communicating with the interior of the said still.

An upcast tube C leads from the upper end of the still or boiler, A, and occupies a central position in a second cylinder D that is suitably supported above the still and arranged to serve either as a condenser or a simple cooler according to the manner in which it may be proposed to use the apparatus.

The upper and lower heads $t\,v$ of the condensing or cooling cylinder D are perforated to receive the ends of a series of vertical cooling tubes E that surround the central upcast.

Above the upper head $t$ of the condenser D is a receiving chamber $l$ into which the upper end of the upcast C enters. This receiving chamber $l$ also communicates with the still or boiler A through a pipe S the lower end of which is extended below the level of the liquid in the said boiler. A vertically movable valve $r$ is supported in the top of the chamber $l$ in position to be moved downward so as to be seated in and close the upper end of the upcast tube C. By means of a hand wheel $w$ on the outer end of the valve stem the valve $r$ can be moved up or down to permit or prevent communication through the upcast C as may be desired.

In the lower part of the chamber $l$ is a perforated diaphragm or sieve $m$ arranged intermediate the cylinder head $t$ and the upper end of the upcast C for the purpose of finely dividing the vapor or water as the case may be before it is allowed to descend through the pipes E of the condenser or cooler.

The lower ends of the tubes E communicate with an annular collecting chamber or vessel F that is provided with an exit pipe or tube $n$ through which the purified water is drawn off.

The still or boiler A is supplied with water through a pipe $h$ provided with a hand valve $i$ and leading from a tank or reservoir $g$ that may be supported at a suitable elevation. Water is supplied to the lower end of the condenser D through a pipe $o$ and escapes at the top through a pipe $p$ discharging into the tank or reservoir $g$ to which an overflow pipe $q$ may be connected. By means of a water gage glass $k$ on the still or boiler A the height of the water therein can be ascertained at a glance and by means of the hand valve $i$ the required quantity can be easily regulated.

The still or boiler A rests on a furnace G surrounding the depending water tubes B which thus provide an extended heating surface.

In using this apparatus for distilling water the valve $r$ will be lifted away from the uptake C and the boiler or still supplied with a suitable quantity of water. By means of a fire in the furnace the water will be caused to boil and the resulting steam will rise through the open uptake C into the chamber $l$ and be finely divided in passing down through the sieve or perforated diaphragm $m$ so that an even trickling will take place through the same, drops being formed which fall through the tubes E of the condenser. The purified water is collected in the chamber or vessel F whence it may be run off and stored for use.

The tubes E are constantly surrounded with cold water which flows into the cylinder D at o and out again at p in such way that a cooling of the distilled water takes place. The water used for cooling the pipes E may also, by means of the tank g, be used for supplying the still or boiler. Any excess of water running into the tank g will be carried off by the overflow pipe.

In order merely to boil the water in the still and subsequently cool it in the condenser the valve r will be closed down to cut off communication, through the uptake C, between the boiler A and chamber l but leaving the pipe or tube S open. The hand valve i of the pipe h will, of course be closed after the boiler has been supplied with a sufficient quantity of water. The steam evolved by the boiling of the water will now exert such a pressure on the hot water as to cause it to rise through the pipe or tube S and pass into the chamber l whence it will flow through the sieve m and cooling tubes E into the collecting vessel or chamber. It will thus be seen that the apparatus is adapted for purifying and sterilizing water either by distillation or by simple boiling and cooling.

In order to adapt the apparatus to the required mode of operation it is only necessary to set the valve r in such position as to leave the upcast C open for the passage of steam or aqueous vapor into the chamber l when distilling, or move the said valve into position to close the upcast C if the sterilizing of the water is to be accomplished by simple boiling, in which case the confined steam acting on the water in the boiler will force the hot water through the pipe S into the chamber l and thence through the cooling pipes E into the collecting chamber.

The apparatus is safe and efficient, it is very easily managed and is conveniently adapted for domestic purposes and other uses.

What I claim as my invention is—

In an apparatus for sterilizing water, the combination of a boiler, a receiving chamber communicating with the boiler, a cooling or condensing cylinder arranged below said receiving chamber and having a water inlet at its lower end and an outlet at its upper end, a collecting chamber located below said cylinder and provided with an outlet, a series of vertical tubes leading from the receiving chamber and extended through the cooling cylinder to the collecting chamber into which said tubes discharge, an elevated tank into which the outlet from the cylinder discharges, and a valved pipe leading from said elevated tank to the boiler, substantially as shown and described.

In witness whereof I have hereunto set my hand in presence of two witnesses.

JOSEF NAGEL.

Witnesses:
PAUL PULUSEN,
ADOLF HERZOG.